May 18, 1965  F. G. STULLER ETAL  3,184,034
LOG DECK AND SEPARATOR
Filed Feb. 11, 1963  4 Sheets-Sheet 1
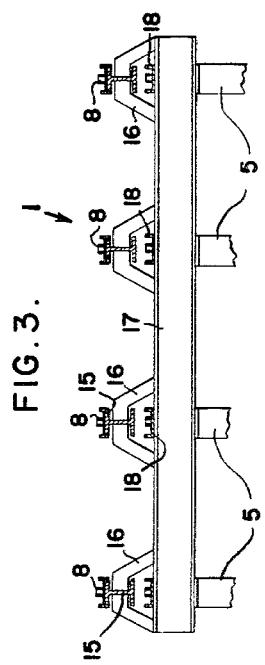
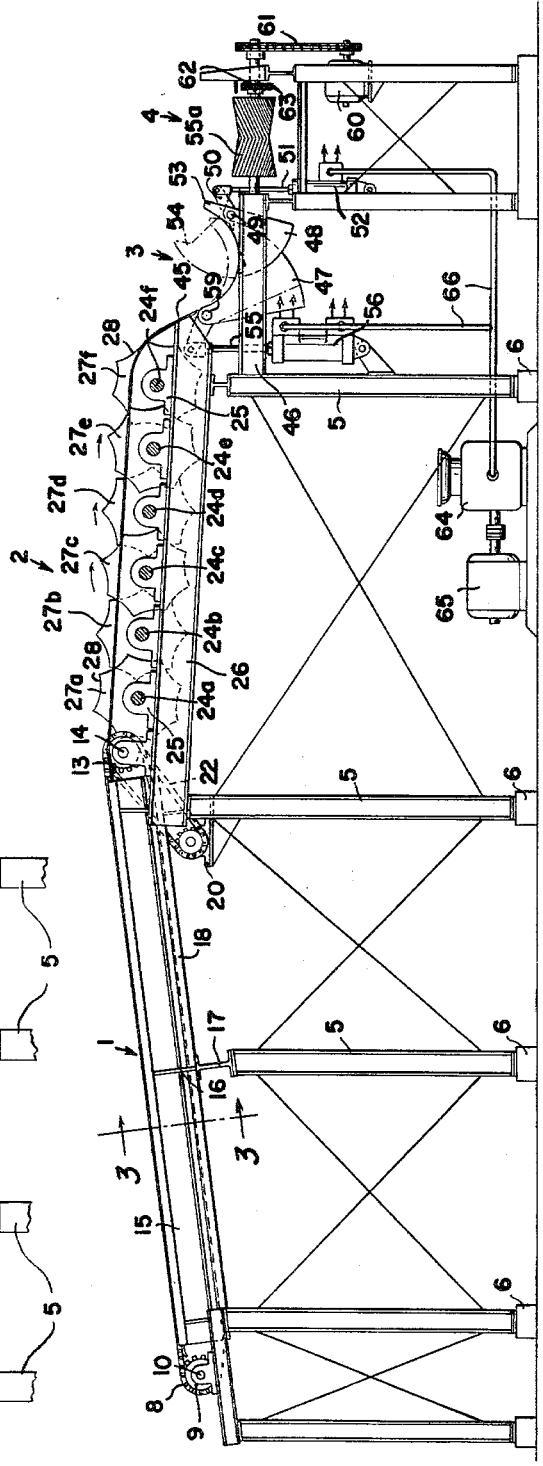

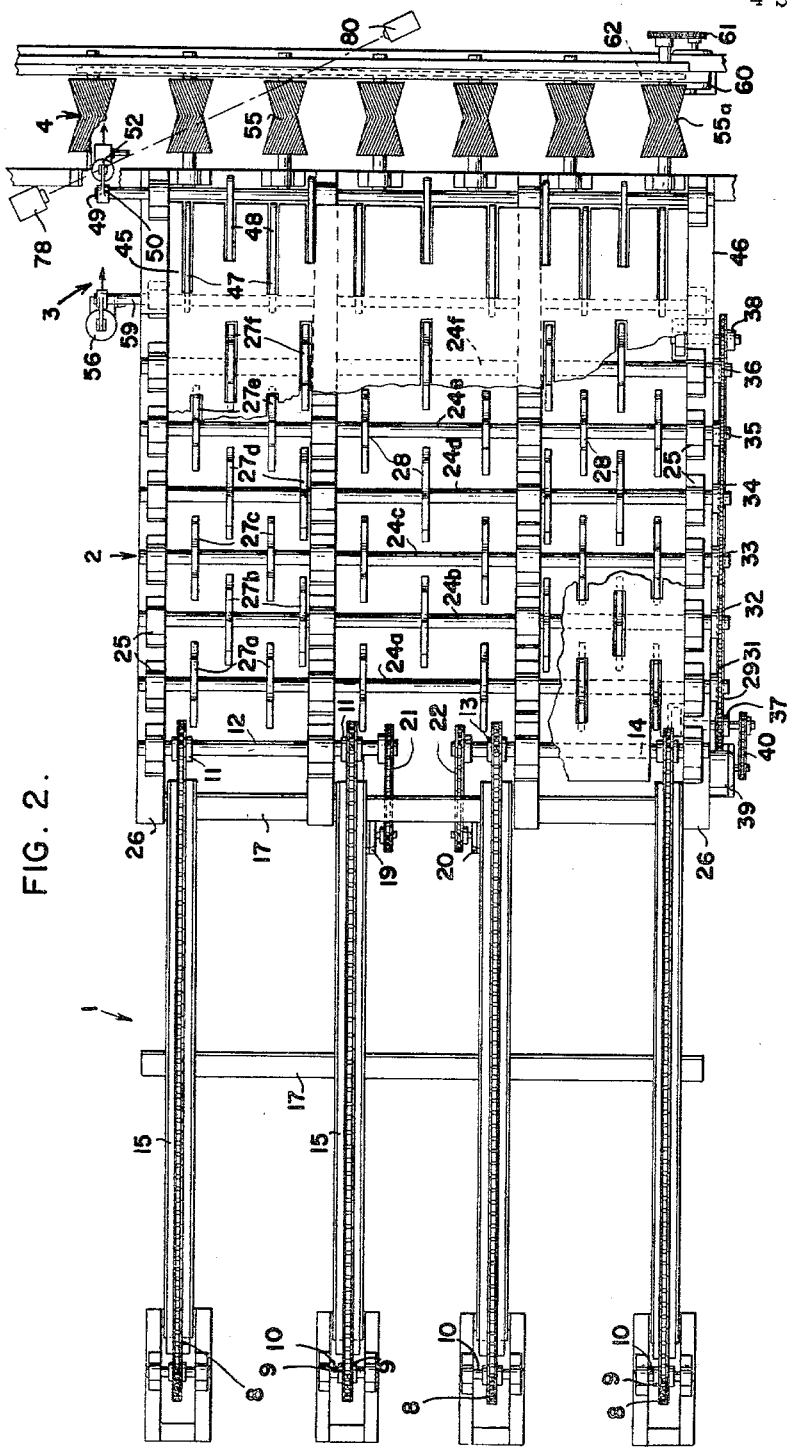

FIG. 15.
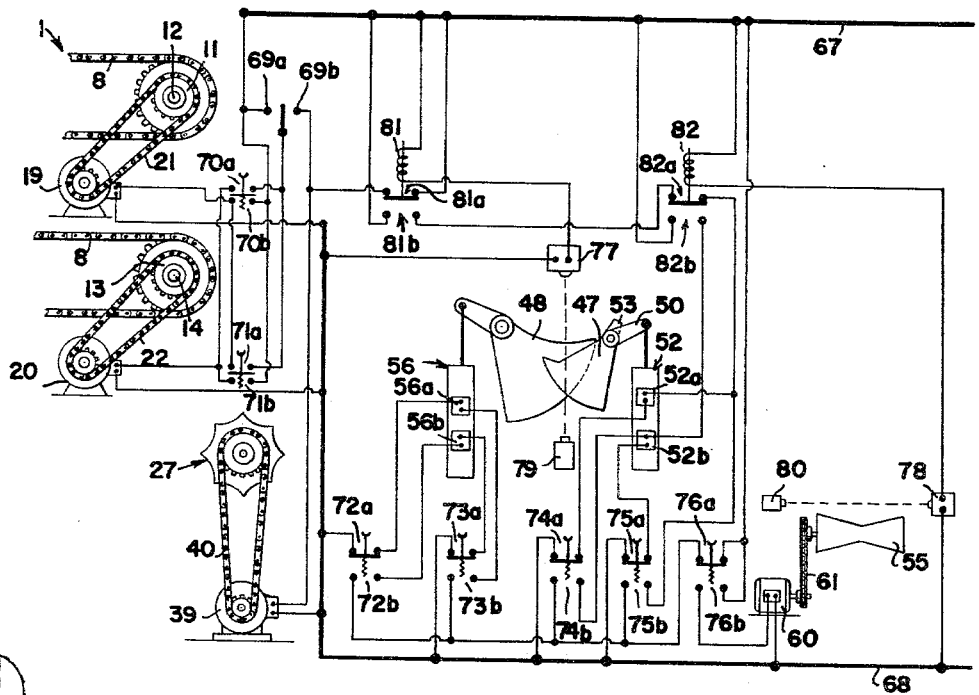
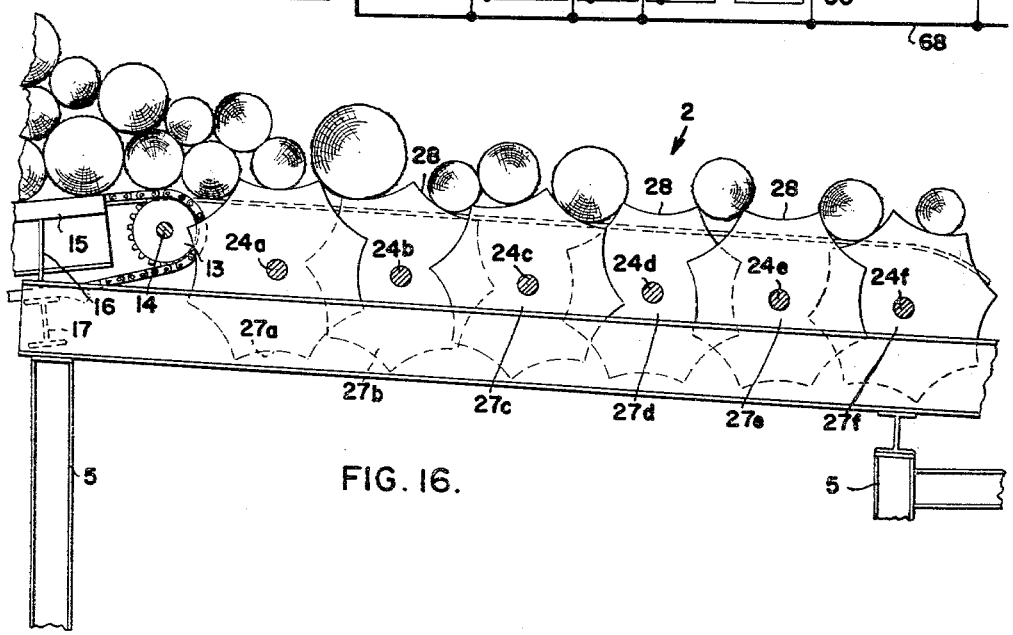
FIG. 16.

United States Patent Office 3,184,034
Patented May 18, 1965

3,184,034
LOG DECK AND SEPARATOR
Frank G. Stuller, William H. Gumz, and Eugene J. Anderson, Milwaukee, Wis., assignors to Rex Chainbelt Inc., Milwaukee, Wis., a corporation of Wisconsin
Filed Feb. 11, 1963, Ser. No. 257,623
6 Claims. (Cl. 198—29)

This invention relates to apparatus for receiving unassorted log as from a storage yard and for delivering the logs individually as required to a series of rolls which convey the logs endwise and individually. The roll conveyor is controlled by an operator who controls delivery of the logs to the mill for debarking or sawing into boards.

According to the invention, a transfer deck includes a series of lobed wheels which operate to separate and transfer the logs from a receiving platform to a trough alongside the roll conveyor. The wheels are arranged so that only one log at a time generally reaches the trough and only two logs at the most will only occasionally be delivered to the trough. Electrical means are provided to actuate a series of transfer arms which pivot upwardly so that the log rolls down onto the roll conveyor. The electrical control of the apparatus is initiated by the operator located within sight of the trough so that, in the event that two logs have been delivered to the trough, he can adjust a series of positioning arms to effect separation of the logs in the trough and so that each log will be delivered separately to the roll conveyor.

A principal object of the invention is to provide apparatus capable of receiving a large stock of unassorted logs of random lengths and of separating the logs while advancing the same towards the trough so that the logs fall individually into the trough and are disposed lengthwise respecting the roll conveyor.

Another object of the invention is to provide automatically operating apparatus for advancing of the pile and delivering an individual log to the trough after the log which was in the trough has been delivered by the roll conveyor to the cut-off station.

Another object is to provide the operator with a simply-controlled means for separating two logs within the trough so that they are successively delivered to the roll conveyor as required and in response to the operation of the rolls of the conveyor.

Another object of the invention is to provide mechanically fool-proof and simple-to-operate means for separating two logs and delivering them one at a time to the roll conveyor.

Another object is to provide improved log receiving and separating means which are rugged and reliable, and require a minimum of maintenance and rebuilding.

Another object is to provide reliable means for orienting and separating the logs so that they are lengthwise with respect to the direction of the rollers.

The drawings furnished herewith illustrate the best mode of carrying out the invention as presently contemplated and set forth hereinafter.

In the drawings:

FIG. 1 is a side elevation of the receiving platform and the separating deck, and an end elevation of the receiving trough and the roll conveyor. The shafts of the separating deck are broken away and sectioned and the drive means is shown separately in another figure;

FIG. 2 is a plan view of the assembly shown in FIGURE 1 including the receiving platform, the separating deck with drive means, the trough and the receiving end of the roll conveyor;

FIG. 3 is a section taken on line 3—3 of FIGURE 1 to show the transporting chains of the receiving platform;

FIG. 4 is a side elevation of the drive means of the transfer deck shown in plan in FIG. 2;

FIG. 5 is a section taken on line 5—5 of FIG. 4 to show the operation of the drive chain;

FIG. 15 is an operating diagram of the log-handling apparatus with the several parts thereof shown diagrammatically; and FIG. 16 is an enlarged side elevation of the separating deck showing the operation of the wheels and movement of the logs by the wheels.

Figure 6:
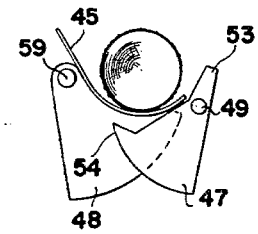
FIGS. 6 through 14 are diagrammatic views showing various placements of logs in the trough and their repositioning by the positioning arms as will be described for transfer singly to the roll conveyor.

The log-handling apparatus shown in the drawings comprises the receiving platform 1, the separating and transfer deck 2, the positioning trough 3, and the roll conveyor 4. The entire assembly is supported by the brace, structural-steel posts 5 on the concrete footings 6 at a height which is generally determined by the installation. The logs from the storage yard are of various lengths and sizes and are placed onto platform 1 by a crane, not shown, and in a pile which is moved toward deck 2 which takes the logs from the pile and separates them as they are transferred across the deck to the trough 3.

Photoelectric means responsive to the delivery of each log into trough 3 interrupts operation of the transfer deck and platform until the log is removed to conveyor 4 which delivers each log to a cut-off saw, not shown.

The operator of the cut-off saw controls the delivery of each log by the roll conveyor 4 and other photoelectric means responsive thereto prevents the removal of the log in the trough to the conveyor until the log on the conveyor has cleared the end of the trough.

The transfer deck 2 is unique by reason of the fact that it is capable of handling mixed logs including the smallest sizes which would be cut, and will separate them so that generally one log at a time is dropped into trough 3 and so that no more than two logs are at any time dropped into trough 3.

The trough 3 includes positioning arms capable of being set so that any two logs in the trough will then be separately removed to conveyor 4. The trough is within sight of the cut-off saw operator and operation of the arms by the operator also suspends operation of the platform and deck until both logs have been removed from the trough. Deck 2 and trough 3 are operable in conjunction to deliver one log at a time to conveyor 4 so that the cut-off saw operator or another person is never obliged to separate the logs on the conveyor by hand.

Platform 1 includes the several parallel carrier chains 8 operating over the tail sprockets 9 carried by shafts 10. The chains on one side of the centerline of platform 1 are driven by the head sprockets 11 carried by shaft 12 and the chains on the other side of the platform are driven by sprockets 13 carried by shaft 14. The upper runs of chains 8 are carried by the beams 15 supported by the trusses 16 above the cross-members 17. The lower runs of the chains are carried in the channels 18 supported on cross-members 17 beneath beams 15.

Shafts 12 and 14 are separately driven by the motors 19 and 20 respectively connected thereto by the chain drives 21 and 2. The logs placed on the platform rest on chains 8 which carry the logs to one end of the platform. The logs should be generally cross-wise of the platform and by selectively driving motors 19 and 20, as will be described, the pile of logs may be turned or adjusted as required.

Deck 2 which receives the logs from platform 1 includes the series of spaced parallel shafts 24 supported in the bearings 25 on the longitudinal frame members 26. Each shaft 24 carries a series of wheels or discs 27 having lobes 28 arranged in alignment so that the upper lobes form a log-carrying cradle which is adjacent and parallel to similar cradles formed by the wheels of the adjacent shafts.

The shafts 24 and wheels 27 are driven in the same direction by the chain 29 which runs on the rail 30 and in cycloidal engagement with the lower teeth of the several sprockets 31, 32, 33, 34, 35 and 26. Chain 29 operates over the sprockets 37 and 38 at the ends of rail 30 and is driven by the motor 39 and the chain drive 40 connected to sprocket 37.

In the operation of platform 1 and deck 2, the pile of logs on the platform is advanced toward the deck so that the forwardmost logs fall from chains 8 of platform 1 onto the wheels 27a adjacent the end of the platform and carried by the shaft 24 driven by sprocket 31. The peripheral speed of wheels 27a driven by sprocket 31 is slightly greater than the linear speed of chains 8 so that the wheels referred to pull away the forward part of the pile which may be a single log or logs side-by-side or may be a smaller pile several logs high.

Assuming first that a single log has rolled from the pile onto wheels 27a, the log enters the corresponding lobes of the several wheels 27a which are in alignment and the log is supported as in a cradle or trough which moves sidewise in an arc over the shaft 24a driven by sprocket 31. The log is carried on wheels 27a over shaft 24a and into engagement with the wheels 27b over shaft 24b and into engagement with the wheels 27c driven by sprocket 33. The log is similarly transferred to and between wheels 27d, 27e and 27f driven by sprockets 34, 35 and 36, respectively. Rotation of wheels 27f drops the log into trough 3 extending alongside deck 2 oppositely of platform 1.

The size and spacing of wheels 27 and number and depth of lobes 28 should be such that the largest logs to be handled are transferred across the deck. Similarly, if all of the logs are to be of the same size, the lobes could be just sufficiently larger to accommodate the logs and their separation would present no great problem. However, if the logs are of various sizes or diameters, the separation of the smaller logs from the larger or from each other is then more difficult to assure by mechanical means. The separation of two logs in trough 3 is provided for as will be described and its operation depends upon the operation of deck 2 which, according to the invention, separates the logs as they are transferred across the deck so that one or no more than two logs at a time are delivered to the trough.

Sprocket 31 is of a given size, or number of teeth, and is driven by motor 39 so that the peripheral speed of wheels 27a is slightly greater than the linear speed of chains 8 and the logs moving onto the wheels from the chains are pulled away from the pile of logs remaining on the chains. For separation of the logs, the logs are transferred across the deck at progressively increasing speeds which is accomplished by making sprockets 31 through 36 respectively progressively smaller in size. The corresponding differences in speed of wheels 27a through 27f effects a corresponding spacing in the logs as they are transferred across the deck. The number of wheels 27 determining the width of deck 2 should provide a spacing so that the logs approaching wheels 27f in no case remain piled but are all lying side-by-side on the wheels.

Trough 3 which receives the individual logs from wheels 27f includes the sheet-steel member 45 carried between deck 2 and conveyor 4 by the connecting frame members 46. Trough member 45 is formed with the parallel slots to allow the arms 47 and 48 to enter the trough from beneath. Arms 47 are fixed to the shaft 49 which extends alongside the edge of trough member 45 and conveyor 4. Shaft 49 is suitably supported by members 46 for rotation by the crank 50 fixed to one end of shaft 49 and connected to the piston rod 51 having a piston, not shown, operably disposed in the cylinder 52.

Each of arms 47 and 48 comprises a plate having an arcuate end and is designed to occupy the respective slot at all times so that wood chips cannot clog the slot when each arm 47 is in the downward position.

Figure 7:
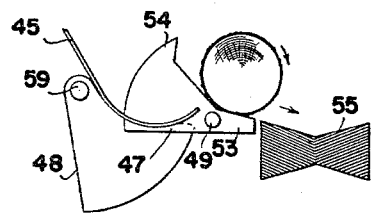

The extensions 53 project upwardly from shaft 49 and prevent logs from rolling into and out of the trough. The end of the arm 47 includes the upward point 54 which is located so that when the arm initially picks up the log from the position shown in FIG. 6 the point holds the log on the arms. Arms 47 lift the log over the edge of trough 3 and, with extensions 53 which move downwardly, the arms form a downward ramp to the rolls 55 of conveyor 4, as shown in FIG. 7, to deliver the log thereto. When the log is on rolls 55, arms 47 return to their lower position below the trough to await the next log and actuation of the cylinder 52 when the log on the conveyor is to be delivered to the operator.

If the operator sees two logs together in trough 3, his actuation of the cylinder 56 instead of cylinder 55, as will be described, repositions the two logs in the trough so that arms 47 then transfer only one of the logs at a time to conveyor 4. The piston rod 57 connects the piston, not shown, operating with cylinder 56 with the crank 58 which is fixed to one end of the shaft 59 to rotate the shaft and raise and lower positioning arms 48 carried by the shaft. The upper profile of each arm 9 in the downward position corresponds with the section of the trough and the location of the shaft 59 is such that raising of the arms repositions the logs in the trough so that the points 54 of transfer arms 47 enter between the logs.

Figure 8:
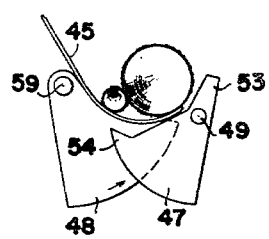
Figure 9:
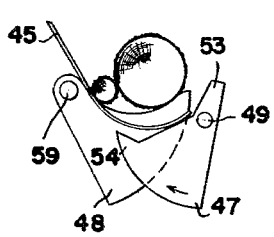
Figure 10:
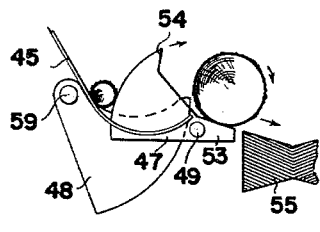
Figure 11:
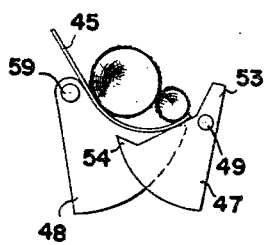
Figure 12:
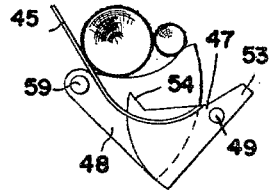

Shaft 59 extends along the side of trough 1 opposite the shaft 49 so that in lifting two logs in the trough, as shown in FIG. 8, arms 48 move the logs upwardly and away from arms 47, as shown in FIG. 9, and so that points 54 at the ends of arms 47 enter between the logs as shown in FIG. 10. The second log in the trough may be the same size or smaller than the first log as shown in FIGS. 8–10. If the second log is appreciably larger than the first log, as shown in FIG. 11, arms 48 then operate to lift the logs somewhat higher as shown in FIG. 12 and the larger log is further elevated by the arms 47 as shown in FIG. 12 when they move upwardly to remove the smaller log.

Each log delivered to conveyor 4 rests on the series of rolls 55 which rotate in one direction to convey the log away from the deck 2. The end-most roll 55a is driven by the motor 60 through the chain drive 61, and the chain 62 operating over the sprockets 63 associated with each roll 55 serves to rotate all rolls 55 at the same speed and in the same direction.

Cylinders 52 and 56 are actuated by fluid pressure supplied by the pump 64 driven by motor 65 and connected by lines 66 with the cylinders. The fluid under pressure operating cylinder 52 is controlled by the solenoid-operated valves 52a and b and the fluid under pressure operating cylinder 56 is controlled by the similar valves 56a and b.

The electrical circuit by which the operator controls the receiving platform 1, deck 2, trough 3 and conveyor 4, is shown in FIG. 15. The main conductors 67 and 68 are connected to a source of electric power, and as shown for simplicity of illustration, the control means is connected directly with the motors. In practice a higher voltage, three-phase current might be used to drive motors 19, 20, 37 and 60 separately of the control voltage.

The manual control means includes the switch unit having positions alternatively closing switches 69a and 69b and an intermediate open position as shown, and the spring biased push-button operated switch units having normally closed switches 70a–76a and normally open switches 70b–76b, respectively.

The automatic control of motors 19, 20 and 39 and transfer arms 47 is provided by the normally-open photoelectric cell-operated relay switches 77 and 78 which close respectively in response to beams of light from the lanterns 79 and 80. Photocell relay switches 77 and 78 are respectively connected in series with the solenoids 81 and 82 to control the latter and open and close the switches 81a and b and 82a and b. The switches 81a and 82a are normally open and the corresponding switches 81b and 82b are normally closed. Energization of solenoid 81 opens switch 81a and closes switch 81b and energization of solenoid 82 opens switch 82a and closes switch 82b.

With switches 69a and b open, the selective control of motors 19 and 20 to adjust the logs on platform 1 is provided by the circuits shown and as follows:

| Switches open | Switches closed | Circuit function |
| --- | --- | --- |
| 70a, 71b | 70b, 71a | Drive motor 19. |
| 71a, 70b | 70a, 71b | Drive motor 20. |

Closing switch 69a provides continuous operation of drive motors 19 and 20 for driving platform 1 while allowing periodic adjustment of the logs only if required according to the circuits affected in the same manner as above.

Any time as the logs on platform 1 approach deck 2, switch 69a may be opened and switch 69b closed for automatic operation of deck 2. Automatic operation is controlled by photocell relay switch 77 which is disposed so that the beam of light from lantern 79 is interrupted when one or more logs fall from deck 2 into trough 3 and by photocell relay switch 78 which is disposed so that the beam of light from lantern 80 is interrupted when a log is delivered to conveyor 4 by transfer arms 47. Switches 72a, 73a, 74a and 75a are respectively in series with solenoid-operated valves 56a, 56b, 52a and complete the following circuits between conductor 68 and switch 76a connected to conductor 67:

| Close switch | To open valve | Switch (normally closed) |
| --- | --- | --- |
| 73b | 56a | 72a |
| 72b | 56b | 73a |
| 75b | 52a | 74a |
| 74b | 52b | 75a |

Manual operation as indicated above will be more fully described hereinafter. Assuming that no logs are in trough 3 or on conveyor 4, switches 77 and 78 are closed to energize solenoids 81 and 82 which open switches 81b and 82b and close switches 81a and 82a to complete only the circuits between conductors 67 and 68 which includes switches 81a, 69b, 70a and 70b to drive motors 19, 20 and 39. The log leaving deck 2 falls into trough 3 causing switch 77 to open and deenergize solenoid 81, to (A) open switch 81a and stop motors 19, 20 and 39 and operation of platform 1 and deck 2, and (B) close switch 81b which completes the circuit including switches 82a and 78a and opens valve 52a to operate cylinder 52 and raise arms 47 for transfer of the log to conveyor 4.

The log on conveyor 4 causes switch 78 to open and deenergize solenoid 82 to: (A) open switch 82a and close valve 52a, and (B) close switch 82b which completes the circuit including switch 75a and valve 52b to relower arms 47.

The relowering of arms 47 allows the beam of light from lantern 79 to reclose switch 77 and reenergize solenoid 81 which: (A) opens switch 81b with no effect (because switch 82a is already open), and (B) closes switch 81a to again complete the circuit including motors 19, 20 and 39 and restart operation of platform 1 and deck 2.

Assuming that the first log remains on conveyor 4 so that switch 82a remains open and switch 82b remains closed, the second log delivered to trough 3 merely opens switch 77 to energize solenoid 81 and open switch 81a to stop motors 19, 20 and 39.

At this stage there is a log on conveyor 4 and a log in trough 3. When the operator is ready to receive the log on conveyor 4, pushing the switch button which opens switch 76a prevents operation of either of cylinders 52 or 56 whether intentional or not, and closes switch 76b which completes the circuit including motor 60 which drives the conveyor to move the log thereon to the operator.

When the log on conveyor 4 passes beyond the light beam from lantern 80 and is clear of trough 3, the light recloses switch 78 which reenergizes solenoid 82 to open switch 82b and close switch 82a which again completes the circuit including switch 81b, valve 52a and switch 74a to effect transfer of the log to the conveyor. Arms 47 relower and platform 1 and deck 2 again resume operation as described, and the sequence of operation continues so that there is always a log waiting on conveyor 4 and a log in trough 3.

In the event that the operator observes two logs in trough 3, he may instead push the button to open switch 73a and close switch 73b to cause cylinder 56 to raise the positioning arms 48. Arms 48 raise slowly so that the operator can control the height to which they are raised according to the relative size of the logs at a given height, as shown for example in FIGS. 8 and 10, the logs are then separated by the points 54 of transfer arms 47 and only one of the logs is transferred to conveyor 4. When arms 48 are raised to the desired position, switch 76b is then closed to operate conveyor 4 to move the log on the conveyor to the operator's position and transfer arms 47 will operate automatically to deliver the single log to the conveyor as described above. If desired, the operator may also raise or lower arms 48 as well as transfer arms 47 to shift the logs as desired within the trough 3 until the operator is sure that only one of the logs is transferred from trough 3 to conveyor 4.

Figure 13:
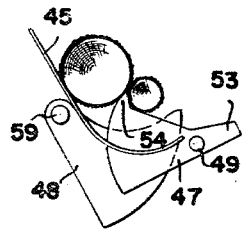
Figure 14:
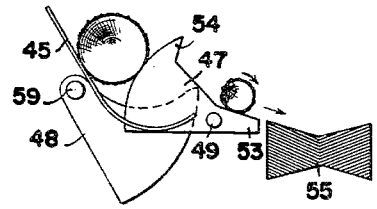

According to the invention, the positioning arms 48 are operable to relocate the logs of any size in the trough and in any relative positions. If a particularly large log lies on top of a smaller log as shown in FIGS. 11 through 13, rounded ends of the transfer arms 47 push the larger log upwardly to engage only the smaller log for transfer to the conveyor as shown in FIG. 14.

When one of two logs is transferred from trough 3, the remaining log continues to interrupt the beam of light from lantern 79 and the photocell relay switch 77 remains open. The operation of platform 1 and deck 2 is resumed only after the log referred to has been transferred to conveyor 4 as described above.

The entire operation thus is entirely automatic insofar as the receiving and separation of the logs is concerned and requires only occasional overriding manual control when a second log may fall in trough 3.

Various modes of carrying out the invention are contemplated as being within the scope of the following claims particularly pointing out and distinctly claiming the subject matter which is regarded as the invention.

We claim:

1. Log handling apparatus for receiving a group of logs and delivering the same one at a time as required, comprising a platform for receiving the group of logs and having power-operated means to move the logs toward one end of the platform, a power-operated deck disposed to receive the logs from said platform and operable to separate and transfer the logs moving across the deck, a trough disposed to receive each log from said deck, power-operated transfer arms disposed to lift the log from the trough and in an upper position forming a ramp downwardly and away from said trough, a power-operated roll conveyor disposed to receive the log from such ramp and to deliver the log as required, sensing means responsive to the presence of a log in the trough, blocking means responsive to a log on said conveyor below the ramp, and actuating means connecting said means and power-operated deck and transfer arms so that the presence of a log in the trough suspends operation of the platform and separating deck and so that provided or when there is no log on the roll conveyor below the ramp the arms are moved to lift the log from the trough to transfer the same to said conveyor.

2. Log handling apparatus for receiving a group of logs and delivering the same one at a time as required, comprising a platform for receiving the group of logs and having power-operated means to move the logs toward one end of the platform, a power-operated deck disposed to receive the logs from said platform and operable to separate and transfer the logs moving across the deck, a trough disposed to receive each log from said deck, power-operated transfer arms disposed to lift the log from the trough and in an upper position forming a ramp downwardly and away from said trough, a power-operated roll conveyor disposed to receive the log from such ramp and to deliver the log as required, sensing means responsive to the presence of a log in the trough, blocking means responsive to a log on said conveyor below the ramp, and actuating means connecting said means and power-operated deck and transfer arms so that the presence of a log in the trough suspends operation of the platform and separating deck and so that provided or when there is no log on the roll conveyor below the ramp the arms are moved to lift the log from the trough to transfer the same to said conveyor, said blocking means being further connected to said actuating means to relower the transfer arms in response to transfer of the log to the conveyor, and said sensing means being responsive to the relowering of the transfer arms to resume operation of the platform and separating deck.

3. Log handling apparatus for receiving a group of logs as from the grapple of a crane and for delivering the logs singly as required, comprising a roll conveyor having manually operable control means, a platform including parallel endless conveyor chains disposed to receive the logs and having drive means for driving said chains and advancing the logs thereon to one end of the platform, a log separating deck adjacent to said one end of the platform and including a plurality of parallel shafts and interspaced wheels having lobes forming a series of adjacent parallel cradles, the wheels forming each cradle having a common shaft and said shafts being spaced and having power means rotating the same in the same direction whereby the logs received from said one end of the platform are transferred from cradle to cradle across the deck, means forming a trough disposed alongside the deck to receive the logs transferred thereacross, a series of transfer arms having a common supporting shaft and actuating means connected thereto to rotate said transfer arms to remove an individual log from the trough and to elevate said arms to an angle and to form a downward ramp to the roll conveyor for delivery of the log thereto, said first named drive means having manually operable controls for driving said chains differentially and adjusting the pile of logs so that they extend generally crosswise of the platform, said power means having sprockets rotating each of the shafts at a different speed to transfer the logs at progressively greater speeds across the deck so that the logs are separated as they are transferred thereacross, the size and depth of the cradles formed by said wheels being such that at most two logs of minimum size can occupy a single cradle and two logs at most may reach the trough together, said trough means including a series of holding arms having a common supporting shaft and manually controlled power means to effect movement of said arms to selectively reposition the logs in the trough, the ends of said transfer arms having upward projections to enter between two such logs as they are selectively repositioned by said holding arms so that said projection enters upwardly between them and only one of said two logs is delivered to the roll conveyor, sensing means connected to said actuating means and responsive to the presence of one or more logs in the trough to automatically operate said transfer arms to deliver the same to the roll conveyor, blocking means connected to said sensing means and responsive to the presence of a log on the roll conveyor below the ramp to prevent operation of said actuating means until the roll conveyor is operated to move the log thereon from below the ramp, a control device connecting said drive means and power means with said sensing means whereby the platform and separating deck operate automatically until a log has been received in the trough and such operation is automatically resumed after such log has been delivered to the trough and the trough is again empty, said blocking means being connected to said manually controlled power means whereby repositioning of the logs by said holding arms temporarily suspends operation of said transfer arms, and said manually operable control means being connected to said blocking means whereby operation of said transfer arms is suspended while the roll conveyor is in operation.

4. Log handling apparatus for receiving a group of logs and for delivering the logs singly to a roll conveyor as required, a receiving platform comprising parallel endless conveyor chains disposed to receive the logs and having drive means for driving said chains and advancing the logs thereon to one end of the platform, a log separating deck adjacent to said one end of the platform and including a plurality of parallel shafts and interspaced wheels having lobes forming a series of adjacent parallel cradles, the wheels forming each cradle having a common shaft and said shafts being spaced and having power means rotating the same in the same direction whereby the logs received from said one end of the platform are transferred from cradle to cradle across the deck, means forming a trough disposed alongside the deck to receive the logs transferred thereacross and including a series of holding arms having a common supporting shaft and manually controlled means to effect movement of said arms to selectively reposition the logs in the trough, a series of transfer arms having a common supporting shaft and actuating means connected thereto to rotate said arms to remove an individual log from the trough and to elevate said arms to an angle and to form a downward ramp to the roll conveyor for delivery of the log thereto, said first named drive means having manually operable controls for driving said chains differentially and adjusting the pile of logs so that they extend generally crosswise of the platform, said power means having sprockets rotating each of the shafts at a different speed to transfer the logs at progressively greater speeds across the deck so that the logs are separated as they are transferred thereacross, the size and depth of the cradles formed by said wheels being such that at most two logs of minimum size can occupy a single cradle and two logs at most may reach the trough together, the ends of said transfer arms having upward projections to enter between two such logs in the trough as they are repositioned by said holding arms so that said projection enters upwardly between them and only one of said two logs is delivered to the roll conveyor, sensing means connected to said actuating means and responsive to the presence of a log in the trough to automatically operate said transfer arms to deliver the log to the roll conveyor, blocking means connected to said sensing means and responsive to the presence of a log on the roll conveyor below the ramp to prevent operation of said actuating means as until the roll conveyor is operated to move the log thereon from below the ramp, and a control device connecting said drive means and power means with said sensing means whereby the platform and separating deck operate automatically until a log has been received in the trough and such operation is automatically resumed after such log has been delivered to the trough and the trough is again empty.

5. Log handling apparatus for receiving a group of logs and delivering the same one at a time as required, comprising a platform for receiving the group of logs and having power-operated means to move the logs toward one end of the platform, a power-operated deck having a series of lobed wheels forming a succession of cradles to receive the logs from said platform and operable to separate and transfer the logs moving across the deck, a trough disposed to receive each log from said deck, power-operated transfer arms disposed to lift the log from the trough and in an upper position forming a ramp downwardly and away from said trough, a power-operated conveyor disposed to receive the log from such ramp and to deliver the log as required, sensing means responsive to the presence of a log in the trough, blocking means responsive to a log on said conveyor below the ramp, and actuating means connecting said means and power-operated deck and transfer arms so that the presence of a log in the trough suspends operation of the platform and separating deck.

6. Log handling apparatus for receiving a group of logs and delivering the same one at a time as required, comprising a platform for receiving the group of logs and having power-operated means to move the logs toward one end of the platform, a power-operated deck having a series of lobed wheels forming a succession of cradles to receive the logs from said platform and operable to separate and transfer the logs moving across the deck, a trough disposed to receive each log from said deck, power-operated transfer arms disposed to lift the log from the trough and in an upper position forming a ramp downwardly and away from said trough, a power-operated conveyor disposed to receive the log from such ramp and to deliver the log as required, and separately operable positioning arms between said transfer arms disposed to lift two logs in said trough to a selected position which is off-set relative to said ramp so that only one of said two logs is lifted from the trough and delivered to said conveyor.

References Cited by the Examiner
UNITED STATES PATENTS

| | | | |
|---|---|---|---|
| 715,029 | 12/02 | Dailey | 198—27 X |
| 1,299,198 | 4/19 | Low | 198—34 |
| 2,542,200 | 2/51 | Kraeger | 198—37 |
| 2,762,488 | 9/56 | Rendleman | 198—29 |
| 2,765,065 | 10/56 | Liebelt | 198—34 |
| 2,883,036 | 4/59 | Fox | 198—82 |
| 2,888,129 | 5/59 | Chapman | 198—82 |

FOREIGN PATENTS 609,844 10/48 Great Britain.

SAMUEL F. COLEMAN, *Primary Examiner.*
EDWARD A. SROKA, *Examiner.*